US010440884B2

(12) United States Patent
Lopez et al.

(10) Patent No.: US 10,440,884 B2
(45) Date of Patent: Oct. 15, 2019

(54) MATERIAL COLLECTION SYSTEM TUBE FASTNER

(71) Applicant: Deere & Company, Moline, IL (US)

(72) Inventors: Ivan Jesus Lopez, Monterrey (MX); Juan Luis Lara, Santa Catarina (MX); Kyle T. Ressler, West Bend, WI (US); Allen F. Swan, Beaver Dam, WI (US)

(73) Assignee: DEERE + Company, Moline, IL (US)

( * ) Notice: Subject to any disclaimer, the term of this patent is extended or adjusted under 35 U.S.C. 154(b) by 355 days.

(21) Appl. No.: 15/203,880

(22) Filed: Jul. 7, 2016

(65) Prior Publication Data

US 2018/0007829 A1 Jan. 11, 2018

(51) Int. Cl.
A01D 34/71 (2006.01)
A01D 43/063 (2006.01)
A01D 34/66 (2006.01)
A01D 101/00 (2006.01)

(52) U.S. Cl.
CPC ........... A01D 34/71 (2013.01); A01D 34/66 (2013.01); A01D 43/063 (2013.01); A01D 2101/00 (2013.01)

(58) Field of Classification Search
CPC ........ A01D 34/71; A01D 34/66; A01D 43/06; A01D 43/063; A01D 43/0631; A01D 57/26
See application file for complete search history.

(56) References Cited

U.S. PATENT DOCUMENTS

| 3,112,598 | A | * | 12/1963 | Heth | A01D 43/063 56/16.6 |
| 3,118,267 | A | * | 1/1964 | Shaw | A01D 34/71 56/17.5 |
| 3,192,692 | A | * | 7/1965 | Slemmons | A01D 43/063 56/13.4 |
| 3,716,977 | A | * | 2/1973 | Jackson | A01D 43/063 15/83 |
| 3,750,378 | A | * | 8/1973 | Thorud | A01D 43/0631 56/10.5 |
| 3,797,214 | A |   | 3/1974 | Erdman et al. | |
| 4,047,367 | A | * | 9/1977 | Thorud | A01D 43/063 56/202 |
| 4,158,279 | A | * | 6/1979 | Jackson | A01D 43/07 56/16.6 |
| 4,735,037 | A | * | 4/1988 | Benter | A01D 43/077 56/13.3 |
| 4,800,712 | A |   | 1/1989 | Morse et al. | |

(Continued)

FOREIGN PATENT DOCUMENTS

JP H02200111 A 8/1990

OTHER PUBLICATIONS

European Search Report issued in counterpart application No. 17179841.6 dated Dec. 4, 2017. (7 pages).

Primary Examiner — Thomas B Will
Assistant Examiner — Joan D Misa

(57) ABSTRACT

A material collection system tube fastener includes a mounting rod attached to a material collection system tube. The mounting rod has a first end inserted into a bushing at a first end of a side discharge outlet on a multi-blade mower deck, and a second end engaging a hook at a second end of the side discharge outlet. The mounting rod may pivot in the bushing to move the material collection system tube toward and away from the side discharge outlet.

7 Claims, 3 Drawing Sheets

(56) References Cited

U.S. PATENT DOCUMENTS

| | | | |
|---|---|---|---|
| 5,018,344 A * | 5/1991 | Samejima | A01D 43/077 56/13.3 |
| 5,669,212 A * | 9/1997 | Bening | A01D 43/077 56/13.3 |
| 5,992,135 A | 11/1999 | Benway | |
| 6,393,815 B1 * | 5/2002 | Funk | A01D 34/662 56/202 |
| 6,910,322 B2 | 6/2005 | Schroeder et al. | |
| 8,857,145 B2 | 11/2014 | Volovsek | |

\* cited by examiner

MATERIAL COLLECTION SYSTEM TUBE FASTNER

FIELD OF THE INVENTION

This invention relates to mower decks and, more specifically, to a material collection system tube fastener on a multi-blade mower deck.

BACKGROUND OF THE INVENTION

Grass mowing machines with mower decks may have two or three rotating blades for cutting grass or other vegetation, and a side discharge outlet from the mower deck. The side discharge outlet allows clippings cut by the blades to exit the side of the mower deck where the clippings are deposited onto the turf. On some mower decks the side discharge outlet extends up through the top of the mower deck. The rotating mower blades may provide an updraft to propel clippings upwardly from the mower deck through this part of the side discharge outlet.

Grass mowing machines typically include a chute that extends outwardly over the side discharge outlet. In the side discharge position, the chute directs cut materials downwardly into the turf, and helps prevent clippings and other objects from being thrown outwardly or upwardly as they exit the mower deck. The chute may be mounted to the mower deck with a hinge mechanism and may be spring biased to a downward position. The hinge mechanism allows the chute to pivot upwardly when the chute comes in contact with an obstacle such as when mowing close to a fence or building or mowing around trees. The spring biases the chute back down to its downward position after the chute clears the obstruction.

Some mower decks also have a second, inner chute positioned directly beneath the main or outer chute described above. The inner chute may be mounted to the mower deck with a hinge and spring mechanism. In the first position, the inner chute may cover only the top portion of the side discharge outlet. The inner chute may be biased downwardly but may be pivoted up to a second position generally exposing the top portion of the discharge outlet.

Some mower decks may be converted from a side discharge position to a material collection position, in which clippings may be directed out the side discharge outlet and through a tube into hoppers or other containers carried by the grass mowing machine. The clippings may be directed upwardly from the mower deck through the outlet by the updraft generated by the cutting blades.

To convert the mower from the side discharge position to the material collection position, the outer chute and inner chute may be pivoted upwardly and a material collection system tube may be attached to the mower deck over the side discharge outlet. Some mower decks may be converted frequently from the side discharge position to the material collection position. In the past, elastic straps with hooks were used to install and fasten material collection system tubes on mower decks. However, it can be difficult or awkward to stretch the elastic straps and to fasten or unfasten the hooks. Additionally, the straps may lose their elasticity. There is a need for a material collection system tube fastener that is easy to install or remove from the mower deck, with minimal effort or complexity. There is a need for a material collection system tube fastener that has few parts and is relatively inexpensive.

SUMMARY OF THE INVENTION

A material collection system tube fastener includes a mounting rod having a first end supported by a bushing and a second end engaged by the hook. The mounting rod is attached to a material collection system tube that is pivotable to rest on the multi-blade mower over the side discharge outlet in a material collection position. The bushing and hook may be provided on each end of a side discharge outlet guard of a multi-blade mower deck.

DESCRIPTION OF THE PREFERRED EMBODIMENT

Figure 1:
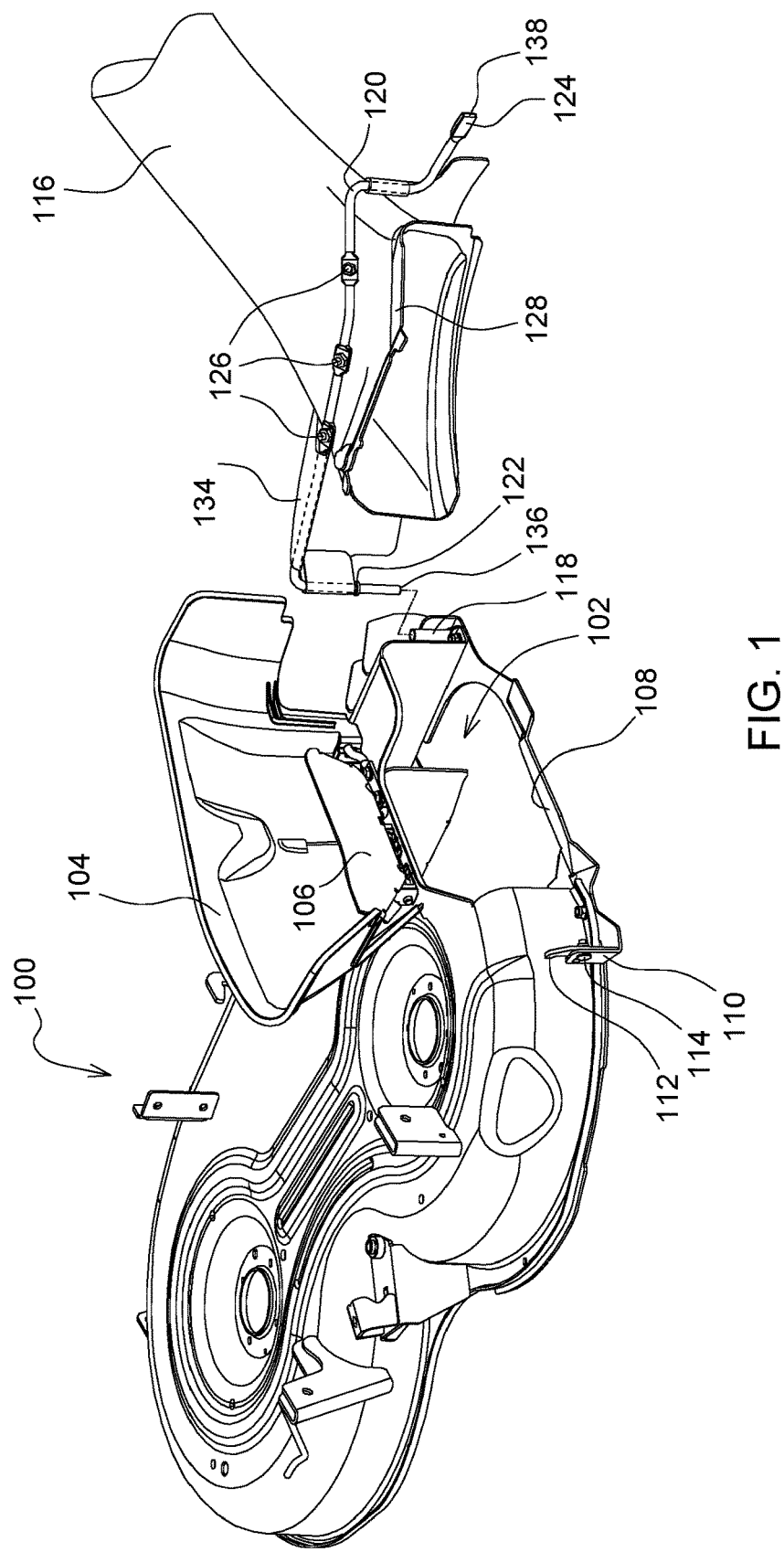
FIG. 1 is a perspective view of a material collection system tube fastener that is disconnected from the mower deck according to a first embodiment of the invention.
Figure 2:
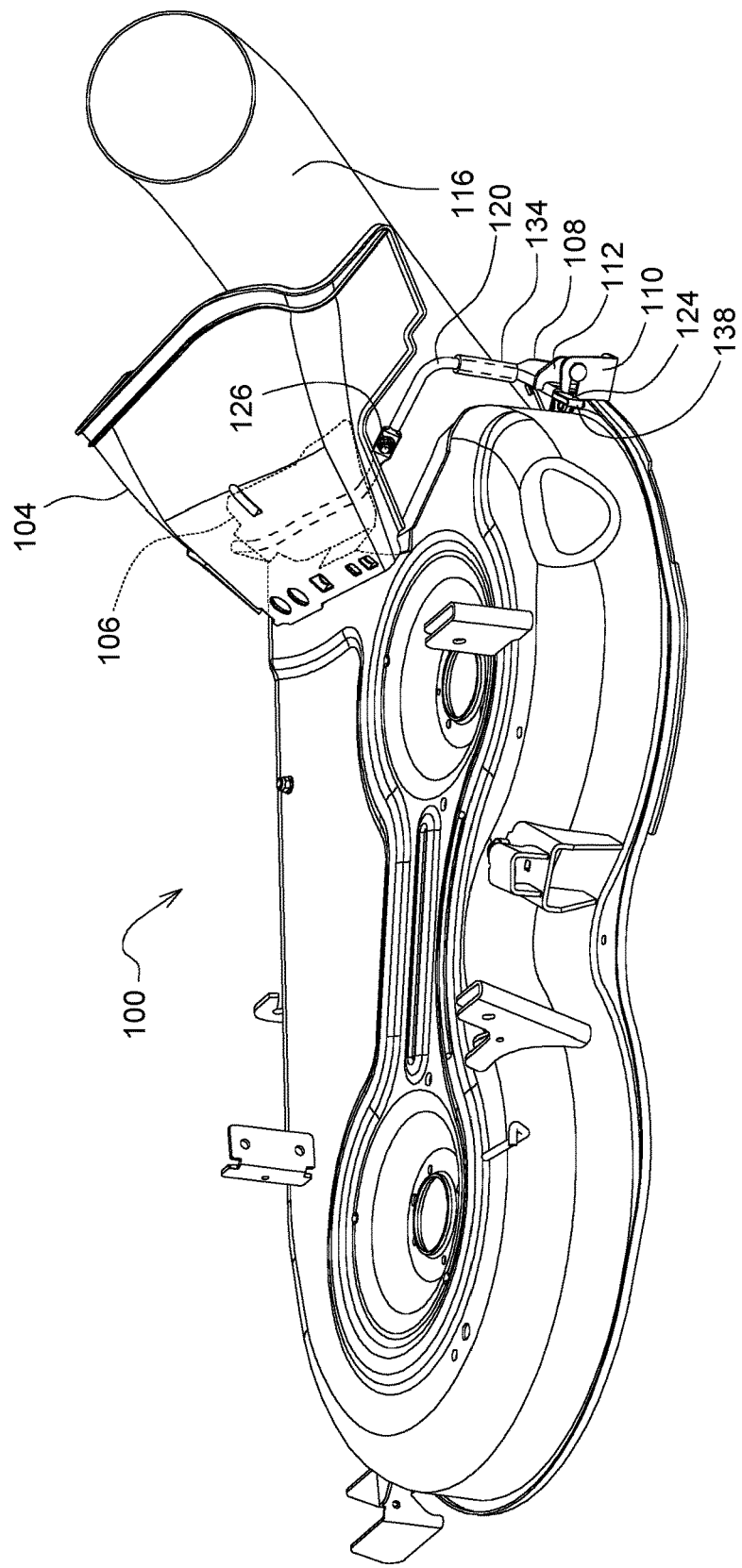
FIG. 2 is a rear side perspective view of a material collection system tube fastener that is installed on the mower deck according to a first embodiment of the invention.
Figure 3:
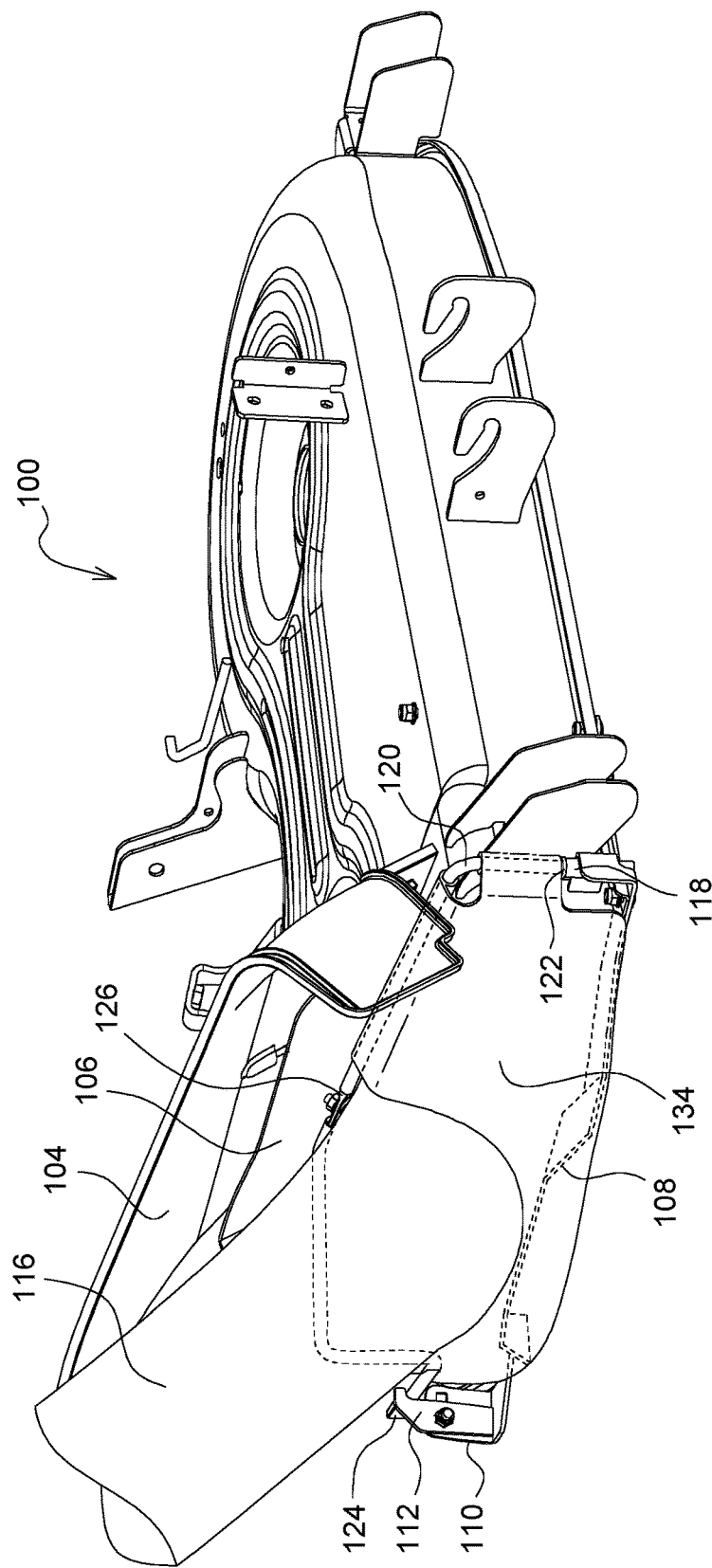
FIG. 3 is a front side perspective view of a material collection system tube fastener that is installed on the mower deck according to a first embodiment of the invention.

As shown in FIGS. 1-3, in a first embodiment, multi-blade mower deck 100 may be suspended from a vehicle such as a lawn tractor. A plurality of mower blades may be attached to spindles that extend through the deck and rotate to cut grass. The blades may be driven by a belt drive system that receives rotational power from an output shaft of the engine. The mower deck may include side discharge outlet 102 which is an opening through the side wall of mower deck where clippings exit in a side discharge mode. The side discharge outlet may include an opening in the sidewall and an opening in the top of the mower deck through which clippings travel upwardly when operating in a material collection mode. The side discharge outlet may have a forward end near the front of the mower deck and a rearward end adjacent the rear of the mower deck.

In one embodiment, outer chute 104 may be pivotably mounted on the mower deck over the side discharge outlet. The outer chute may be mounted with a hinge mechanism that allows the outer chute to pivot between first and second positions. The outer chute may be biased downwardly to the first position covering the side discharge outlet. In the first position, the outer chute may direct clippings downwardly into the turf, and may block clippings and other objects from being thrown upwardly as they pass through the outlet while mowing. The hinge may provide an axis about which the outer chute may pivot upwardly from the first position to the second position shown in FIG. 1.

In one embodiment, inner chute 106 may be pivotably mounted on the mower deck directly beneath outer chute 104. The inner chute may be mounted with a hinge mechanism that allows the inner chute to pivot between first and second positions. A spring may bias the inner chute downwardly to the first position covering and generally enclosing the top portion of the side discharge outlet. The inner chute may be pivoted up from the first position to a second position generally exposing the top portion of the side discharge outlet.

In one embodiment, side discharge outlet guard 108 may provide a rigid border around the lower edge of the side discharge outlet. The side discharge outlet guard may extend between the forward end and the rearward end of the side discharge outlet. The side discharge outlet guard may be integral with the mower deck, or may be a plate or strip that is attached to the mower deck. For example, as shown in FIGS. 1-3, the side discharge outlet guard may be a plate or strip attached to the mower deck with bolts or sheet metal screws through holes in the deck lip or lower edge adjacent the forward end and rearward end of the side discharge outlet.

In one embodiment, the material collection system tube fastener may include hook 112 mounted on the mower deck adjacent the forward or rearward end of side discharge outlet 102. The hook preferably may be mounted so that its position may be adjusted. For example, the hook may be mounted to bracket 110 with mounting bolt 114 inserted through a slot in the bracket, and the hook's position may be changed by moving the mounting bolt within the slot. The hook and/or bracket may be attached or welded directly to the mower deck adjacent the side discharge outlet. Alternatively, as shown in FIGS. 1-3, hook 112 may be mounted to bracket 110 that extends from the rearward end of side discharge outlet guard 108.

In one embodiment, the material collection system tube fastener may include bushing or sleeve 118 mounted on the mower deck adjacent the opposite end of side discharge outlet 102 from hook 112. The bushing or sleeve may be attached or welded directly to the mower deck adjacent the side discharge outlet. Alternatively, as shown in FIGS. 1-3, the bushing or sleeve may be attached or welded to the forward end of side discharge outlet guard 108. The bushing or sleeve may be vertically oriented and dimensioned to pivotably receive and support a first end of mounting rod 120.

In one embodiment, the material collection system tube fastener may include mounting rod 120. The mounting rod may be a one piece wire form rod with a diameter of less than about ½ inch, first or forward end 136 having collar 122, and second or rearward end 138 having flat portion 124. The mounting rod also may have a plurality of mounting portions 126 between the first and second ends. Mounting bolts, rivets, or other fasteners may engage the mounting portions to secure the mounting rod to the upper or top surface of material collection system tube 116. The material collection system tube may be plastic, with an outer diameter of less than about 12 inches, and a flange or lip 128 extending from its top or upper surface that may be positioned to rest on the top surface of the mower deck adjacent the side discharge outlet.

In one embodiment, first end 136 of mounting rod 120 may be inserted into bushing 118 until collar 122 abuts the top of the bushing. The bushing may support the mounting rod and material collection system tube, and they may be pivoted together on the bushing axis toward and away from the side discharge outlet. When the mounting rod and material collection system tube are pivoted next to the side discharge outlet, the flange or lip of the tube may rest on the top of the mower deck, and hook 112 then may engage the second end 138 of the mounting rod. When the hook engages the mounting rod, the mounting rod may hold the tube in the material collection position covering the side discharge outlet. The mounting rod may be sufficiently flexible to bend under the hook, and to press against the material collection system tube to hold it tightly in place against the mower deck. Additionally, in the material collection position, the spring mechanism may urge the inner and/or outer chute downwardly against the mounting rod and/or top surface of the tube.

In one embodiment, the material collection system tube fastener may include cover 134 attached to mounting rod 120. The cover may be part of the fastener assembly that includes mounting rod 120 and material collection system tube 116, and may be installed and removed from the mower deck together as a unit. Cover 134 may hang downwardly from the mounting rod over the side discharge outlet on each side of the material collection system tube, and also may extend under the material collection system tube. Cover 134 may be sufficiently flexible to conform to the side and bottom surfaces of the material collection system tube and the mower deck.

Having described the preferred embodiment, it will become apparent that various modifications can be made without departing from the scope of the invention as defined in the accompanying claims.

The invention claimed is:

1. A material collection system tube fastener, comprising:
   a mounting rod attached to a material collection system tube;
   the mounting rod having a first end inserted into a vertically oriented bushing at a first end of a side discharge outlet on a multi-blade mower deck, and a second end engaging a hook at a second end of the side discharge outlet;
   a hinged side discharge chute above the mounting rod, the mounting rod independently pivoting the material collection system tube toward and away from the side discharge outlet.

2. The material collection system tube fastener of claim 1 further comprising a flexible cover hanging down from mounting rod.

3. The material collection system tube fastener of claim 1 further comprising a side discharge outlet guard around a lower border of the side discharge outlet.

4. The material collection system tube fastener of claim 3 wherein the bushing and the hook are on opposing ends of the side discharge outlet guard.

5. The material collection system tube fastener of claim 1 wherein the hook is attached to a slot.

6. The material collection system tube fastener of claim 1 wherein the mounting rod is held in place by the hinged side discharge chute.

7. The material collection system tube fastener of claim 1 wherein the hinged side discharge chute pivots on an axis that is transverse to the vertically oriented bushing.

\* \* \* \* \*